(12) United States Patent
Sorg

(10) Patent No.: US 9,903,423 B2
(45) Date of Patent: Feb. 27, 2018

(54) FLUID FRICTION CLUTCH

(71) Applicant: BorgWarner Inc., Auburn Hills, MI (US)

(72) Inventor: Wolfgang U. Sorg, Horgenzell (DE)

(73) Assignee: BorgWarner Inc., Auburn Hills, MI (US)

(*) Notice: Subject to any disclaimer, the term of this patent is extended or adjusted under 35 U.S.C. 154(b) by 104 days.

(21) Appl. No.: 14/994,608

(22) Filed: Jan. 13, 2016

(65) Prior Publication Data
US 2016/0208867 A1 Jul. 21, 2016

(30) Foreign Application Priority Data

Jan. 21, 2015 (DE) .................. 10 2015 200 930

(51) Int. Cl.
F16D 35/02 (2006.01)
(52) U.S. Cl.
CPC ........ F16D 35/024 (2013.01); F16D 2300/08 (2013.01); F16D 2300/18 (2013.01)
(58) Field of Classification Search
CPC ..... F16D 35/024; F16D 35/021; F16D 35/028
See application file for complete search history.

(56) References Cited

U.S. PATENT DOCUMENTS

| 7,954,616 | B2 | 6/2011 | Buchholz | |
| 9,316,272 | B1* | 4/2016 | Gwin | F16D 35/021 |
| 9,328,780 | B2* | 5/2016 | Buchholz | F16D 35/024 |
| 2012/0138409 | A1 | 6/2012 | Buchholz et al. | |
| 2012/0255714 | A1 | 10/2012 | Roby et al. | |
| 2012/0279820 | A1* | 11/2012 | Hennessy | F16D 35/024 192/58.4 |
| 2013/0037371 | A1* | 2/2013 | Yamada | F16D 35/024 192/58.5 |
| 2013/0284556 | A1* | 10/2013 | Gevers | F16D 35/024 192/58.61 |
| 2013/0313062 | A1 | 11/2013 | Buchholz | |
| 2014/0209180 | A1* | 7/2014 | Boyer | F16D 35/024 137/15.01 |
| 2014/0360835 | A1 | 12/2014 | Buchholz | |

FOREIGN PATENT DOCUMENTS

EP 1731787 A1 12/2006
WO WO 2014004338 A1 * 1/2014 ........... F16D 35/022

* cited by examiner

Primary Examiner — Jacob S. Scott
Assistant Examiner — Timothy Hannon
(74) Attorney, Agent, or Firm — Harness, Dickey & Pierce, P.L.C.

(57) ABSTRACT

A fluid friction clutch (1) including a housing (2, 3), a clutch plate (4) which is situated on an end (5) of a shaft (6) mounted centrally within the housing (2, 3), a working chamber (9) between the housing (2, 3) and the clutch plate (4), a supply chamber (10) for clutch fluid, and a supply channel (11A, 11B) which leads from the supply chamber (10) to the working chamber (9). A feed pump element (14) which is rotatable with respect to the housing (2, 3), is situated rotationally fixed on the shaft (6), and defines a shear gap (12) with the housing (2, 3). A valve (17) is situated between the feed pump element (14) and the supply chamber (10), the valve (17) in the closed position effectively establishing a main working path (HA) between the feed pump element (14) and the working chamber (9), and the valve (17) in an open position unblocking a discharge path (EP) between the feed pump element (14) and the supply chamber (10).

13 Claims, 5 Drawing Sheets

FLUID FRICTION CLUTCH

CROSS-REFERENCE TO RELATED APPLICATIONS

This application claims the benefit of German Patent Application No. 102015200930.0 filed Jan. 21, 2015, the disclosure of which is herein incorporated by reference in its entirety.

DESCRIPTION

The invention relates to a fluid friction clutch as recited in the preamble of Claim 1.

A fluid friction clutch of this type is known from the disclosure of EP 1 731 787 B1; explicit reference to this disclosure is hereby made by the present application.

The object of the present invention is to create a fluid friction clutch of the type indicated in the preamble to Claim 1 by means of which it is possible to reduce the clutch complexity in a simple way.

The solution to this problem is carried out by the features of Claim 1.

By providing a rotatably mounted feed pump element which defines a shear gap with the housing, it is possible, by utilizing a differential speed between the pump element and the housing or the secondary side of the fluid friction clutch, to generate a differential speed in a simple way as a function of the volume flow from the supply chamber into the working chamber.

The special advantages of the fluid friction clutch according to the invention include the fact that initially only a small quantity of clutch fluid is necessary, since, due to the previously mentioned arrangement, an active feed pump is formed in the oil reservoir, which, with respect to the quantity of clutch fluid, is advantageous over the known exploitation of centrifugal forces for filling the working chamber.

Furthermore, the response behaviors of the fluid friction clutch according to the invention are faster due to the lower quantity of clutch fluid.

Furthermore, an extremely compact design arises, since the outer diameter of the supply chamber or the reservoir may be made larger than the inner diameter of the working chamber.

Furthermore, the advantage arises that the fluid friction clutch according to the invention may be combined with any type of auxiliary units, for example, a coolant pump. By providing a valve, in particular a pressure reduction valve, which is situated between the feed pump element and the supply chamber, the advantage further arises of a simplification of the structure and the operation.

The subclaims contain advantageous refinements of the invention as subject matter.

Additional details, features, and advantages of the present invention arise from the subsequent description of embodiments by way of the drawings.

Figure 1:
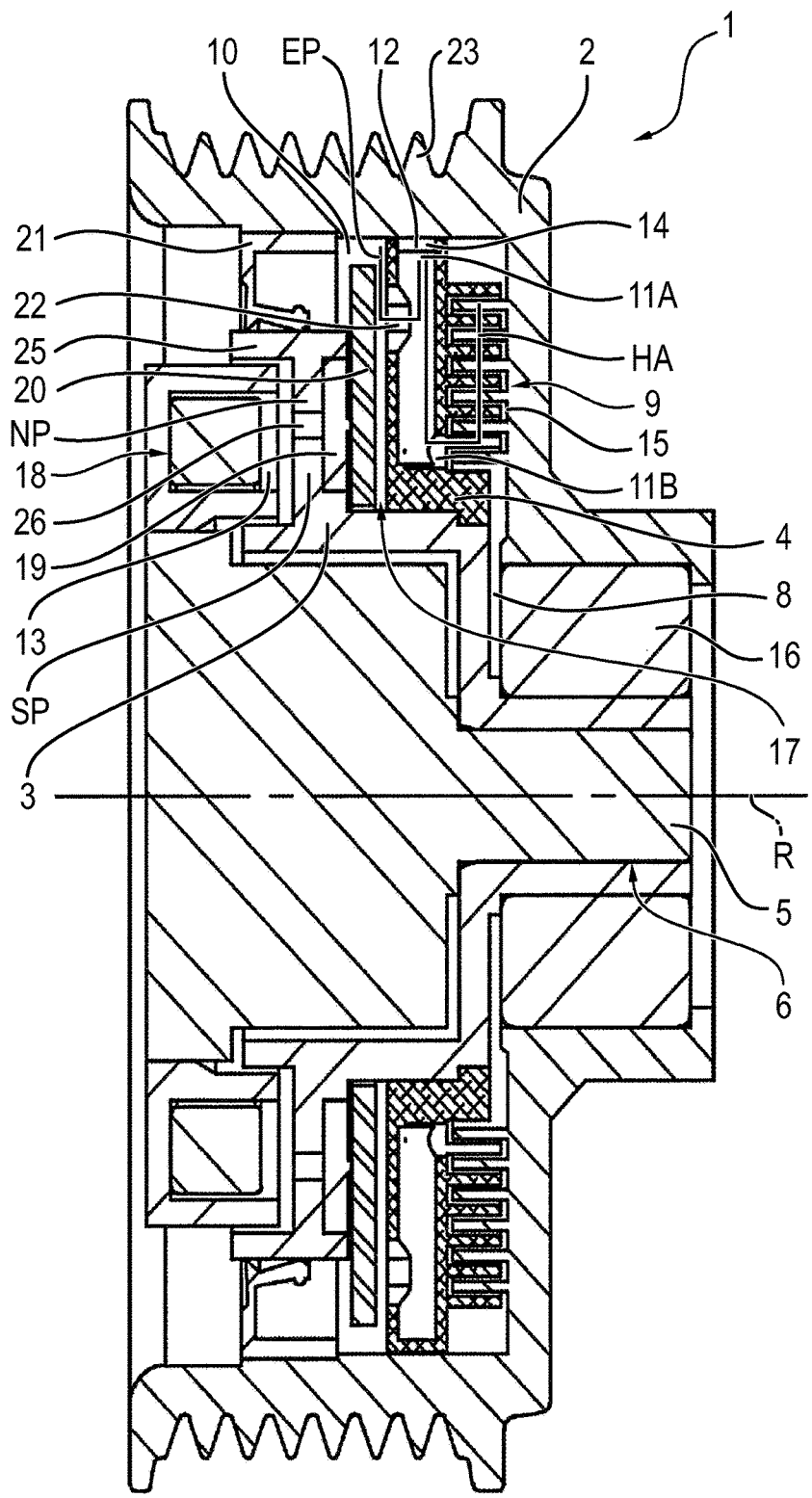
Figure 2:
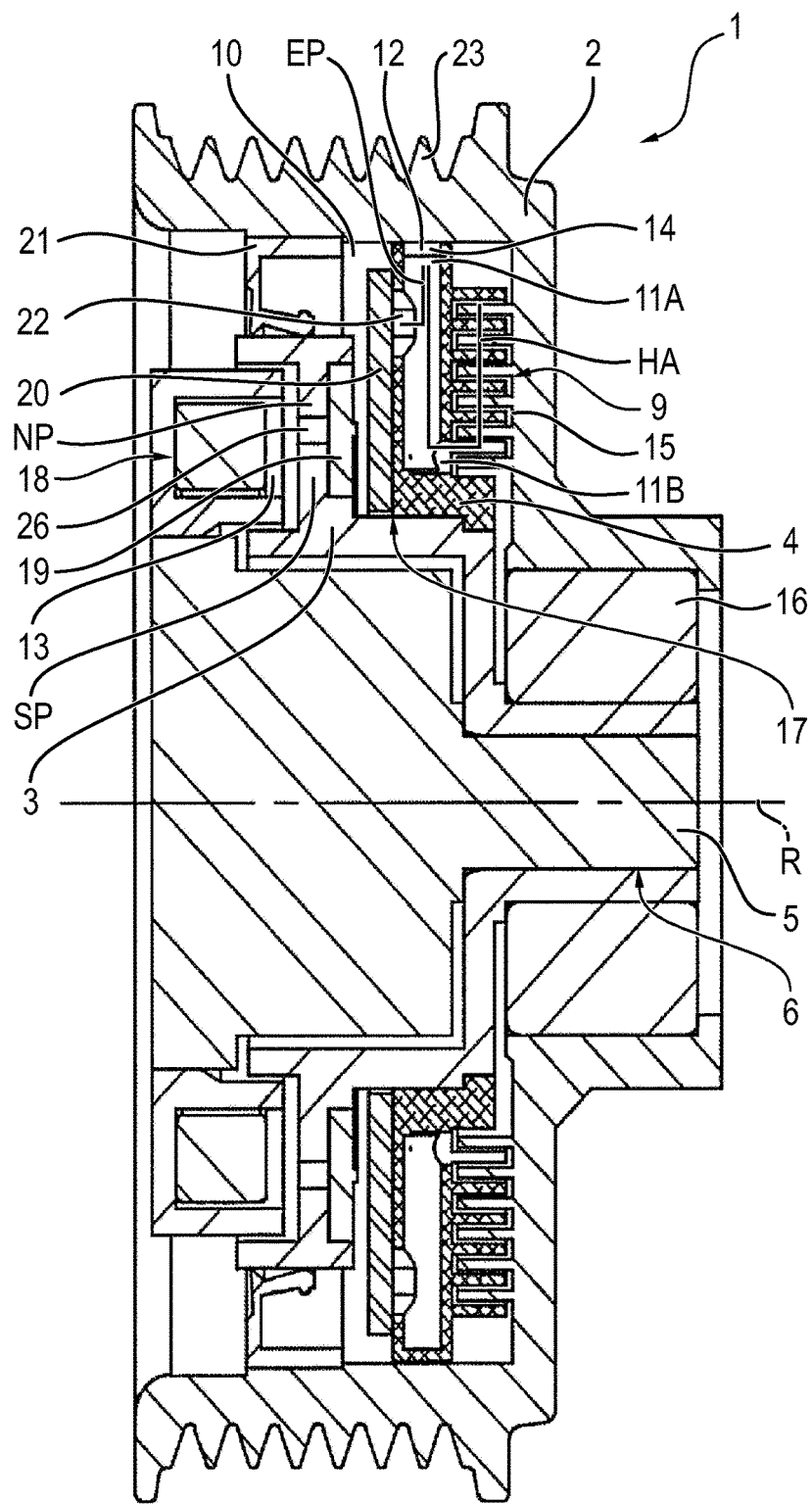
Figure 3:
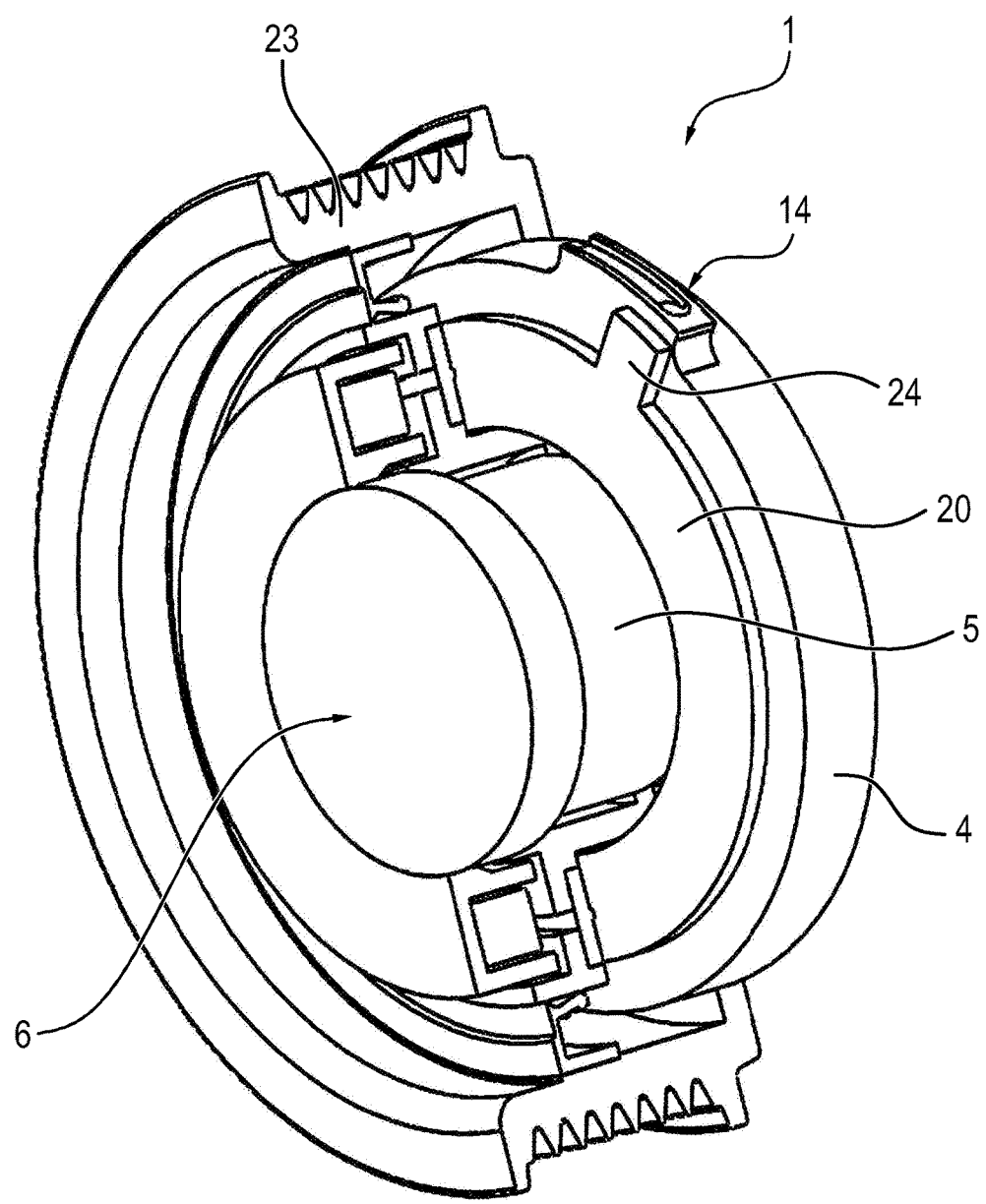
Figure 4:
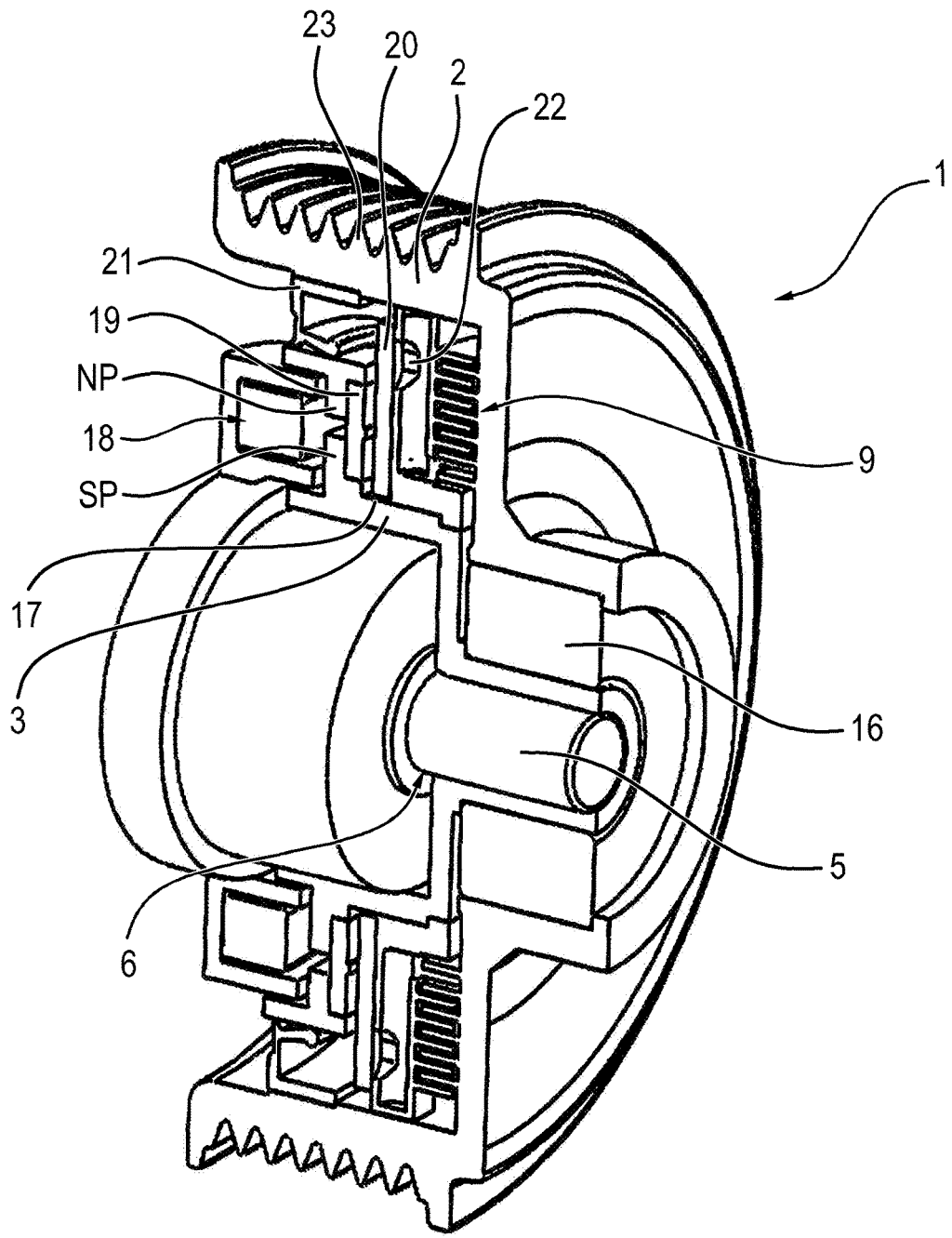
Figure 5:
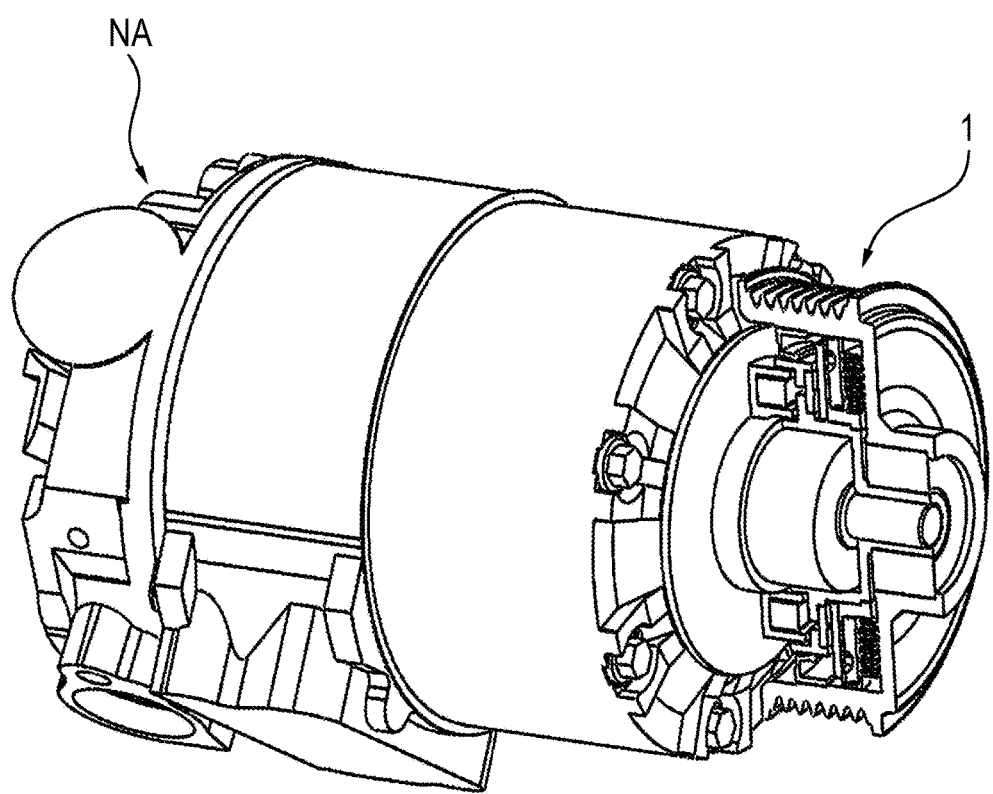

FIG. 1 shows a sectional view of one half of a fluid friction clutch according to the invention with an opened valve, in particular a pressure reduction valve, FIG. 2 shows a depiction corresponding to FIG. 1 with a closed valve, FIG. 3 shows a perspective cut-away depiction of the fluid friction clutch according to the invention in a view from the back, FIG. 4 shows a depiction corresponding to FIG. 3 in the view from the front, and FIG. 5 shows a sectional view of the fluid friction clutch according to the invention with an auxiliary unit, for example an air conditioning compressor.

FIG. 1 shows, according to the depiction selected in this figure, a sectional view of an upper half of fluid friction clutch 1 according to the invention which has an axis of rotation R.

Fluid friction clutch 1 additionally has a housing which is conventionally combined from a housing cover 2 and a housing body 3. In the embodiment shown in FIG. 1, housing body 3 is designed with slots and is connected rotationally fixed to a clutch plate 4.

Clutch plate 4 is situated on an end 5 of a shaft 6 which is mounted centrally within housing 2, 3.

In addition, fluid friction clutch 1 according to the invention has a working chamber 9 between housing 2, 3 and clutch plate 4. Working chamber 9 has, as per usual, a working gap 15 which enables, based on a shear effect, a transmission of torque to the clutch fluid supplied to working chamber 9.

In addition, a supply chamber 10 is provided for the coolant, supply channel 11A, 11B leading from supply chamber 10 to working chamber 9 and thereby forming the feed.

In addition, a return pump system or a recirculation pump may be provided according to the invention, which, although not shown in FIGS. 1 and 2, is still used for the return of the clutch fluid from working chamber 9 to supply chamber 10. Reference with regard to this may be made to the disclosure of EP 2 679 849 A1, which is hereby made explicitly by the reference of the present application to this disclosure.

Supply chamber 10 of fluid friction clutch 1 according to the invention is designed as an external chamber, which means that it lies radially outward when viewed from the point of axis of rotation R, thus radially outside of working chamber 9.

In addition, FIGS. 1 and 2 illustrate that fluid friction clutch 1 is provided with a feed pump element 14 which is rotatable relative to housing 2, 3 and is situated rotationally fixed on the shaft and which defines a shear gap 12 with housing 2, 3. In the embodiment shown in FIGS. 1 and 2, housing cover 2 is integrally connected to a belt pulley 23, which merely represents one option. Belt pulley 23 may also be replaced by other transmission elements and, in addition, belt pulley 23 and housing cover 2 may also be designed as two parts.

In addition, a valve 17 is situated in housing 2, 3 which is situated between feed pump element 14 and supply chamber 10. A shaft sealing ring 21 is situated between cover 2 and housing body 3 to seal supply chamber 10.

In the embodiment shown, this valve 17 is driven by an electromagnetic actuator which has an electromagnet 18 in an accommodation space 13, poles formed in housing body 2, 3 in the form of north pole NP and south pole SP, and an armature disk 20. Armature disk 20 may be pressed by means of a spring (not shown in FIGS. 1 and 2) against clutch plate 4 and thereby closes an opening 22, as this may be seen in FIG. 2. A sealing disk 19 is provided between armature disk 20 and housing body 3 for sealing an opening 26 between poles NP and SP.

In FIG. 1, fluid flows past the actuator and accordingly draws armature disk 20 against the force of the spring so that opening 22 is opened. In this position, a discharge path EP is unblocked, which is used for hydraulic pressure relief of supply channel 11A.

In the closed position shown in FIG. 2, in which opening 22 is closed by means of armature disk 20, the usual main working path HA arises as opening 22 is closed.

In the embodiment of fluid friction clutch 1 shown, an active element, for example a pump wheel or fan wheel, etc. may be located as desired.

In addition, fluid friction clutch 1 according to the invention may be combined with auxiliary equipment NA, as is shown for example in FIG. 5.

As is additionally shown in FIGS. 1 and 2, housing body 3 is supported via a bearing, in particular a ball bearing 16, with respect to housing cover 2.

The location of north pole NP and south pole SP, clarified in FIGS. 1 and 2, may also be reversed.

FIGS. 3 and 4 show perspective, cut away representations of fluid friction clutch 1 according to the invention in different views, whereas FIG. 3, in particular, clarifies the provision of a valve tongue 24, which may be combined with armature disk 20 in order to close opening 22.

FIG. 4 shows fluid friction clutch 1 according to the invention from the side opposite to that of FIG. 3, likewise in a cut away view and in perspective, whereas FIG. 3 again clarifies the inner structure of fluid friction clutch 1 with valve tongue 24, whereas FIG. 4 shows the arrangement of opening 22.

As previously explained, FIG. 5 shows an example of a combination of fluid friction clutch 1 according to the invention in the embodiment explained by means of FIGS. 1 through 4 with auxiliary equipment NA, for example an air conditioning compressor or a coolant pump.

In the preceding written disclosure of the invention, reference is hereby explicitly made to the graphic representation of the invention in FIGS. 1 through 5 as a supplement to the disclosure of the invention.

LIST OF REFERENCES

1 Fluid friction clutch
2, 3 Housing
4 Clutch plate
5 End
6 Shaft
7 Active element
8 Accommodation space for a bearing 16
9 Working chamber
10 Supply chamber
11A, 11B Supply channel
12 Shear gap
13 Accommodation space for electromagnet
14 Feed pump element
15 Working gap
16 Bearing
17 Valve
18 Electromagnet
19 Sealing disk between accommodation space 13 and supply chamber 10
20 Armature disk
21 Shaft sealing ring between supply chamber 10 and accommodation space 13
22 Valve opening
23 Belt pulley
24 Valve tongue
25 Speed measurement unit
26 Opening
NP North pole
SP South pole
R Axis of rotation
EP Discharge path
HA Main working path

The invention claimed is:

1. A fluid friction clutch comprising:
a housing;
a shaft rotatably coupled to the housing;
a clutch plate coupled to the shaft for rotation therewith, the clutch plate and the housing cooperating to form a working chamber;
a supply chamber adapted to retain a clutch fluid therein;
a feed pump element that is disposed in the housing and coupled to the shaft for rotation therewith, the feed pump element cooperating with the housing to define a shear gap;
a supply channel that leads from the shear gap to the working chamber; and
a valve disposed between the feed pump element and the supply chamber, the valve having a valve opening and being operable in an open condition and a closed condition, wherein operation of the valve in the open condition permits fluid flow from the supply channel through the valve opening to the supply chamber, and wherein operation of the valve in the closed condition closes the valve opening.

2. The fluid friction clutch of claim 1, wherein the valve further comprises an armature disk and an electromagnet, wherein the electromagnet is selectively operable to generate a magnetic field to translate the armature disk away from the valve opening when the valve is operated in the open condition.

3. The fluid friction clutch of claim 2, wherein the valve opening is situated in the clutch plate.

4. The fluid friction clutch of claim 2, wherein the armature disk is provided with a valve tongue.

5. The fluid friction clutch of claim 2, further comprising a slotted housing body and a bearing that is disposed between the slotted housing body and the housing, the slotting housing body having a north pole and a south pole that interact with the electromagnet.

6. The fluid friction clutch of claim 5, wherein an annular seal is disposed radially between the housing and the slotted housing body.

7. The fluid friction clutch of claim 5, wherein a shaft sealing ring is situated between the cover and the housing body.

8. The fluid friction clutch of claim 5, wherein the slotted housing body is connected rotationally fixed to the clutch plate.

9. The fluid friction clutch of claim 1, wherein the supply chamber is disposed radially outwardly of a radially inner end of the working chamber.

10. A fluid friction clutch comprising:
a housing;
a shaft rotatably coupled to the housing;
a clutch plate coupled to the shaft for rotation therewith, the clutch plate and the housing cooperating to form a working chamber;
a feed pump element coupled to the clutch plate for rotation therewith, the feed pump element cooperating with the housing to define a shear gap;
an annular supply chamber offset from the shear gap axially along a rotational axis of the clutch plate, the supply chamber being adapted to retain a clutch fluid therein;
a supply channel that leads from the shear gap to the working chamber; and a valve arrangement for selectively allowing fluid to flow from the supply channel to the supply chamber to thereby inhibit fluid from being transmitted through the supply channel to an inlet of the working chamber.

11. The fluid friction clutch of claim 10, wherein the valve arrangement comprises a valve opening, which is formed in the clutch plate so as to intersect the supply channel, and a valve member that is movable axially along the rotational axis between a first position, which closes the valve opening, and a second position that clears the valve opening.

12. The fluid friction clutch of claim 11, further comprising an actuator for selectively moving the valve member.

13. The fluid friction clutch of claim 12, wherein the actuator comprises an electromagnet and wherein the valve member comprises an armature.

* * * * *